United States Patent [19]

Fisher

[11] 3,944,023
[45] Mar. 16, 1976

[54] RELEASABLE RESTRAINT IN AN INFLATABLE EMERGENCY EVACUATION SLIDE

[75] Inventor: John M. Fisher, Cuyahoga Falls, Ohio

[73] Assignee: The B. F. Goodrich Company, Akron, Ohio

[22] Filed: Mar. 7, 1975

[21] Appl. No.: 556,101

[52] U.S. Cl. ............................... 182/48; 403/2
[51] Int. Cl.² ............................... A62D 1/20
[58] Field of Search ............... 403/2; 285/1, 2, 3, 4; 85/DIG. 1; 24/201 TR, 115 F, 201 LP, 201 R, 230 R; 59/93, 86; 182/48; 193/25 B

[56] References Cited
UNITED STATES PATENTS

| | | | |
|---|---|---|---|
| 2,165,656 | 7/1939 | Ryan | 285/2 |
| 3,119,298 | 1/1964 | Brown | 285/2 |
| 3,270,494 | 9/1966 | Holmes | 59/86 |
| 3,553,912 | 1/1971 | Rogers | 285/2 |
| 3,669,217 | 6/1972 | Fisher | 182/48 |

Primary Examiner—Andrew V. Kundrat
Attorney, Agent, or Firm—Harry F. Pepper, Jr.; W. A. Shira, Jr.

[57] ABSTRACT

A tie-back device restrains full extension of an evacuation slide until a predetermined inflation is attained. Inflation of the slide causes tension to be applied to the device. The device comprises two attachment rings and two components which are coupled by a shear pin. A transparent cover is permanently attached to one component. This cover makes the device tamperproof and nonreusable. The cover, in conjunction with the attachment rings and the two components, allows tensile forces to be applied to the shear pin from only one direction.

11 Claims, 3 Drawing Figures

RELEASABLE RESTRAINT IN AN INFLATABLE EMERGENCY EVACUATION SLIDE

BACKGROUND OF THE INVENTION

This invention relates to inflatable emergency evacuation slides used primarily on aircraft, and particularly to tie-back devices used in conjunction with these slides.

In the case of crash landings or other aircraft emergencies away from an airport terminal building, it is desirable to evacuate passengers or cargo as quickly as possible. Emergency evacuation slides have been provided on most aircraft for this purpose. Presently, the most common type of evacuation slide used is an inflatable ramp which is stored in its deflated condition. In emergencies, the deflated slide is extended from the aircraft and then inflated. When the slide is extended from the aircraft, it hangs in a relatively limp position. In this position it is highly vulnerable to wind deflection which occurs when a cross wind blows toward the evacuation exit. In such a case, the limp slide may be blown underneath the aircraft, thus making it completely useless when inflated. For further discussion of this problem, see U.S. Pat. No. 3,018,867. To eliminate the problem of wind deflection, devices have been used to restrain the full extension of the slide until it is almost fully inflated. In many such devices, the lower end of the slide is secured to the upper end until a suitable inflation pressure is attained. Upon release of the lower end of the slide, the inflation pressure forces the lower end to first swing outward from the aircraft, and then downward to the ground. Further discussion of the mechanics of this operation can be found in U.S. Pat. No. 3,391,771.

Preferably, the tie-back device used to secure the lower end of the slide is self-releasing when full extension of the slide is advantageous. A self-releasing restraint eliminates human error due to panic or lack of skill.

It is imperative that the restrain be released at a precise inflation pressure. Deviation from this pressure can render the slide useless. Release of an underinflated slide may cause wind deflection problems heretofore discussed. On the other hand, undue delay in fully extending the slide can be disastrous in a situation where time is of the essence. A restraint device which is set to release at an inflation pressure that will never be attained will also render the slide useless.

Hook and pile fasteners as in U.S. Pat. Nos. 3,606,939 and 3,669,217 are one of the many types of releasable restraints which have been proposed. Other proposals have included types of frictionally engaging components, as in U.S. Pat. Nos. 3,391,771 and 3,463,266.

Problems can arise regarding the dependability of the previously known types of releasable restraint devices. As was previously noted, release at a precise inflation pressure is necessary. General weather conditions, such as temperature, humidity and dampness can alter the predetermined release inflation pressure of hook and pile type fasteners. Weather and dampness can also have a detrimental effect on a friction type release device. Expansion and contraction of the friction materials can cause a change in the coefficients of friction of the engaging surfaces. This can cause a critical change in release inflation pressure. Corrosion due to exposure to the atmosphere can also affect the coefficients of friction of some friction type devices.

Many of the previously proposed devices are designed for reuse. Reuse ultimately causes wear which can change the release inflation pressure. Problems of incorrect release inflation pressure can arise when the device is being prepared for reuse by someone not skilled to do so. Furthermore most such devices are not tamperproof.

After deployment of the folded slide, most prior release devices have no protection from outside forces which can affect the release inflation pressure. For example, a wind blowing against the slide can cause the slide to twist. This can result in a twisting force being applied to the release device. Most devices cannot discriminate between forces from the inflation pressure and other forces. Thus, even though a particular device may release precisely upon application of a predetermined load, the load may be applied by forces that are irrelevant to inflation pressure.

SUMMARY OF THE INVENTION

It is an object of this invention to provide an inflatable emergency evacuation slide with a dependable, non-reusable and tamperproof restraint device that will release at a precise predetermined inflation pressure.

It is a further object of this invention to provide a releasable restraint device that is essentially unaffected by weather conditions, corrosion, dampness or age.

It is a further object of this invention to provide a releasable restraint that is essentially unaffected by forces other than inflation pressure of the evacuation slide.

These and other objects of this invention which will become evident by the description of the invention are achieved by an inflatable emergency evacuation slide which is held in a folded position by a shear pin type releasable restraint. The releasable restraint further comprises two coupled components and a rigid, preferably transparent cover. Tension due to inflation pressure of the slide is applied to the device by means of attachment rings. Only one attachment ring can move relative to the cover, and this movement is restricted to one direction by guide slots in the cover.

DESCRIPTION OF A PRESENTLY PREFERRED EMBODIMENT

Figure 1:
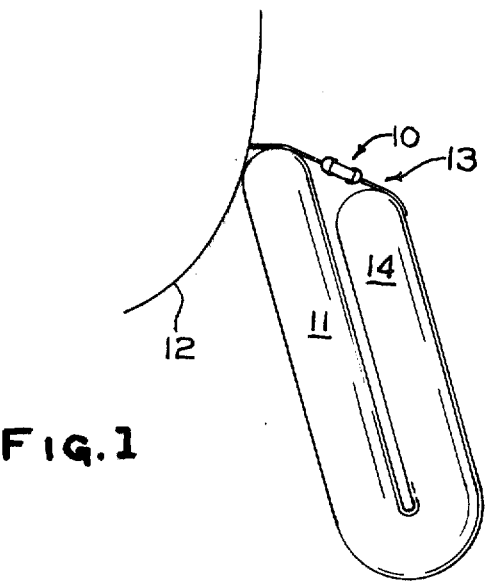
FIG. 1 is a side view of a partially inflated evacuation slide. The slide is being held in a folded position by a releasable restraint device which is attached to the aircraft and to the bottom of the slide.
Figure 2:
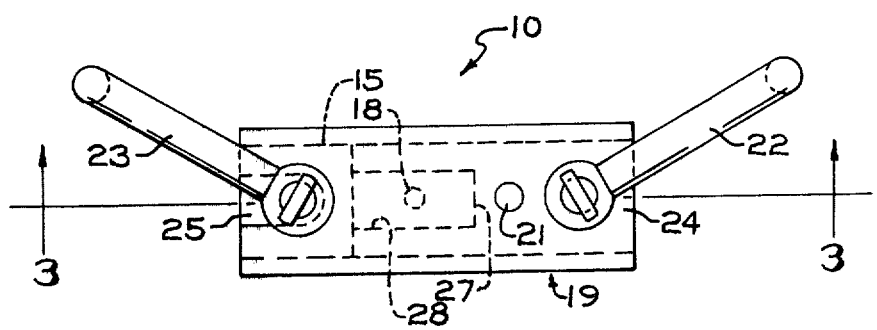
FIG. 2 is an end view of the releasable restraint device according to a preferred embodiment.

Referring to FIG. 1, an inflatable emergency evacuation slide 11 having a releasable restraint 10 is shown extended in a jackknife position from a portion 12 of an aircraft. The slide 11 is held in this position until the restraint is released. In the arrangement shown, tension is transmitted to the releasable restraint 10 by means of a rope or cord 13. This rope or cord is attached to the aircraft portion 12 and to the lower end 14 of the slide 11.

Figure 3:
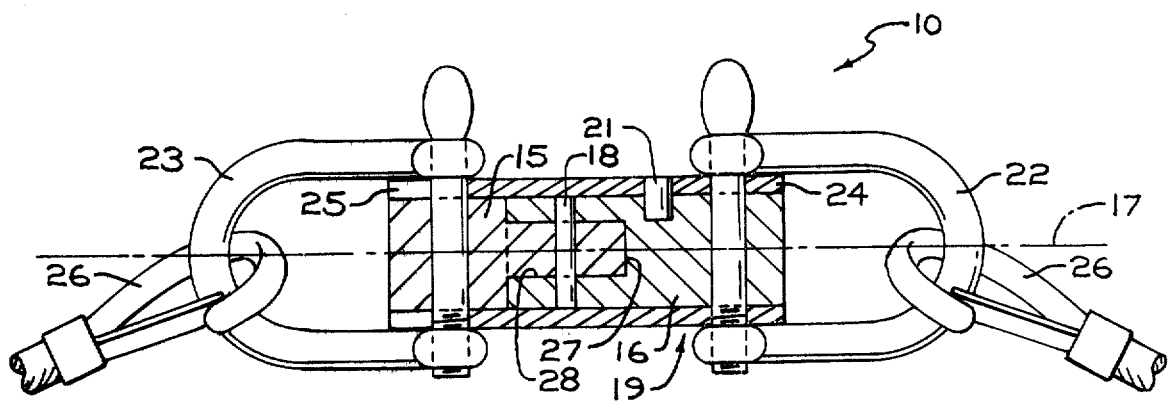
FIG. 3 is a sectional view of the releasable restraint device taken along line 2—2 of FIG. 2.

As is more clearly seen in FIG. 3, the releasable restraint 10 comprises cylindrical components 15 and 16 which are coupled together. Component 15 has a cylindrical protrusion 27 which projects axially out of the main body of component 15. Component 16 has an axial, cylindrical cavity 28 which receives the protrusion 27 of component 15. Preferably, the length of the protrusion 27 is about 4 times its width or diameter, thus allowing it to assist in guidance of the components during uncoupling. It is understood that the cylindrical shape of the components and the specific coupling arrangement shown are not essential to this invention. In a preferred embodiment, the coupled components 15 and 16 form another cylinder having a longitudinal axis 17.

The coupled components are held together up to a predetermined release load by at least one shear pin 18 which passes through protrusion 27 of component 15 and cavity 28 of component 16. Shear pin devices are considered extremely reliable for use in a releasable restraint because they are essentially unaffected by weather conditions and dampness. The surface condition of a shear pin ordinarily is not critical because a load applied to it will be carried primarily by its internal structure.

By using a shear pin release device, the release load can accurately be set at virtually any magnitude. Aircraft of different types and sizes may require different sizes of emergency escape slides. Thus, releasable restraints such as 10 will be required to release at various predetermined loads, depending on the size of the escape slide it is used with. The presently contemplated release loads range from 30 to 480 pounds. This range can be widely broadened by varying the number of shear pins in each releasable restraint 10, the diameter of each shear pin, the material of each shear pin, or any combination thereof. The shear pin 18 shown in FIG. 3 is designed to shear at two planes. The release load can be further multiplied by requiring each pin to shear at three or more planes. The release load can also be diminished by requiring each pin to shear at only one plane.

Preferably, the shear pin 18 is in a plane perpendicular to the longitudinal axis 17 of the cylinder formed by components 15 and 16. By this positioning any force transmitted to the shear pin 18 will be applied through its smallest cross section.

The releasable restraint 10 further comprises a cover 19. In the preferred embodiment the cover extends the entire length of the cylinder formed by the components 15 and 16. The cover thus encloses the shear pin 18 and holds it in position. The cover 19 is preferably transparent, allowing the shear pin and other components within to be visible. Proposed cover materials include tubular plastics which are readily available commercially and can be cut to length. In a preferred embodiment the cover 19 is a hollow cylinder with an inside diameter sized to fit closely over the cylinder formed by components 15 and 16. The cover thus assists in guidance of the components along the longitudinal axis 17 during uncoupling.

The cover 19 is permanently or inseparably attached to one component. It, therefore, prevents any tampering with the shear pin 18. After uncoupling of components 15 and 16, the cover prevents replacement of the used shear pin by permanently blocking the hole in which another shear pin might be inserted. This eliminates any possible reuse of the releasable restraint with a shear pin that will cause an incorrect release load. In a preferred embodiment, the cover 19 is attached to component 16 by means of a roll pin 21 which is permanently embedded in component 16. Other means of permanently or inseparably attaching the cover 19 to one component are available within the scope of this invention. For example, the cover can be attached by heat shrinking it onto one component or by adhering it to one component by bonding or with a permanent adhesive.

The releasable restraint 10 further comprises means to transmit tension from the rope or cord 13 to the components 15 and 16, respectively. In the preferred embodiment the means are attachment rings 23 and 22, which pass through components 15 and 16. The rope or cord 13 may be linked either directly to the attachment rings or by some other means such as clips 26. These attachment rings pass through special openings in the cover 19. Attachment ring 22 passes through two holes 24 while attachment ring 23 passes through two guide slots 25. The guide slots 25 allow the attachment ring 23 to exert a force on component 15 along the longitudinal axis 17. The guide slots 25 further permit uncoupling of components 15 and 16 upon shearing of the shear pin 18. Each of these special openings in the cover is wide enough to allow its corresponding attachment ring to pass through, but narrow enough to prevent forces in all directions, except those substantially parallel to the longitudinal axis 17, from acting on the shear pin 18. Thus, forces applied to the attachment rings from other directions, such as a twisting force applied by the wind, cannot cause an early release.

In operation, the evacuation slide 11 is inflated causing tension to be applied to the rope or cord 13 which transmits the force to the attachment rings. The attachment rings 22 and 23 transmit the force to components 16 and 15, respectively. The force is ultimately applied to the shear pin 18. When a predetermined release load is attained, the pin 18 will be sheared causing the uncoupling of components 15 and 16. The roll pin 21 causes the cover 19 to remain permanently or inseparably attached to component 16. The cover 19 renders the releasable restraint 10 nonreusable.

Although a structure of the type disclosed for the purpose of illustrating one embodiment of the invention is especially suitable for installation in aircraft, it should be understood, of course, that numerous modifications or alterations may be made therein without departing from the spirit and the scope of the invention as set forth in the amended claims.

I claim:

1. In combination with an inflatable emergency evacuation slide, a releasable restraint joined to at least one portion of said slide, wherein the releasable restraint comprises:
    a. two components;
    b. at least one shear pin which couples the two components; and
    c. a sleeve-like covering:
        1. inseparably affixed to one component; and
        2. enclosing the at least one shear pin such that the at least one shear pin is essentially inaccessible.

2. An improvement as defined in claim 1 in which the covering is an essentially transparent plastic.

3. An improvement as defined in claim 1 comprising at least one roll pin inseparably affixing the covering to the one component.

4. An improvement as defined in claim 1 further comprising means to prevent release of the restraint from forces in all but essentially one direction relative to the two components.

5. An improvement as defined in claim 1 in which the two components form a cylinder when coupled.

6. An improvement as defined in claim 5 further comprising means to prevent release of the restraint from forces in all but essentially one direction relative to the two components.

7. An improvement as defined in claim 6 in which the essentially one direction is parallel to the longitudinal axis of the cylinder.

8. An improvement as defined in claim 5 in which the at least one shear pin is positioned in a plane perpendicular to the longitudinal axis of the cylinder.

9. An improvement as defined in claim 8 in which the at least one shear pin extends completely through the two components.

10. An improvement as defined in claim 9 in which the covering is a hollow cylinder.

11. An improvement as defined in claim 10 in which a portion of each of the two components is cylindrical.

* * * * *